April 23, 1957 LA MAR S. WILLIAMS 2,789,732
SALT AND PEPPER SHAKER
Filed Nov. 1, 1955
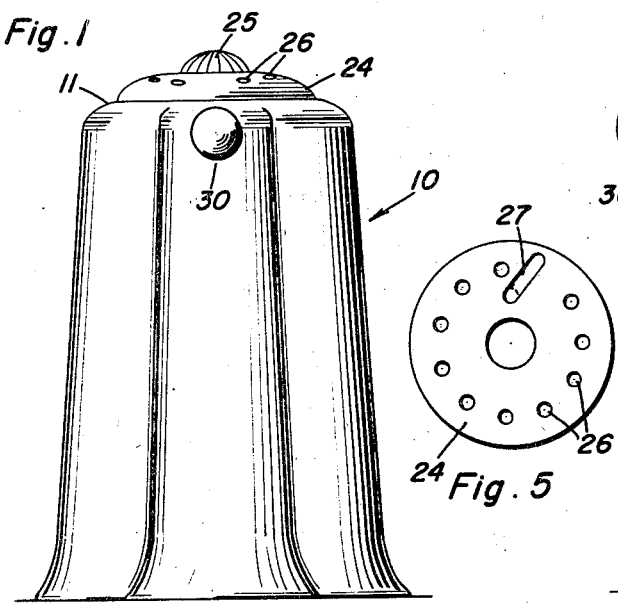
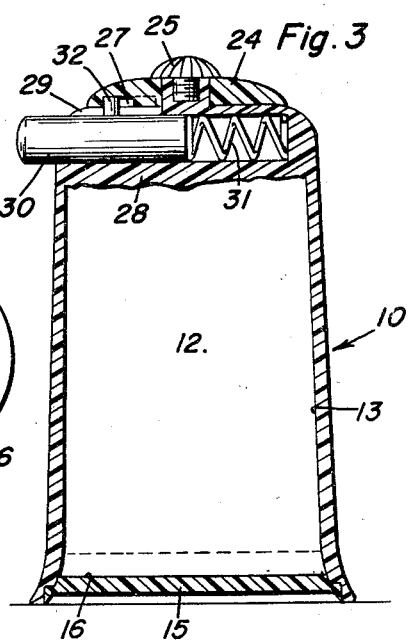
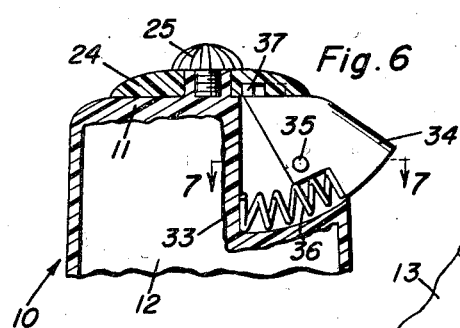
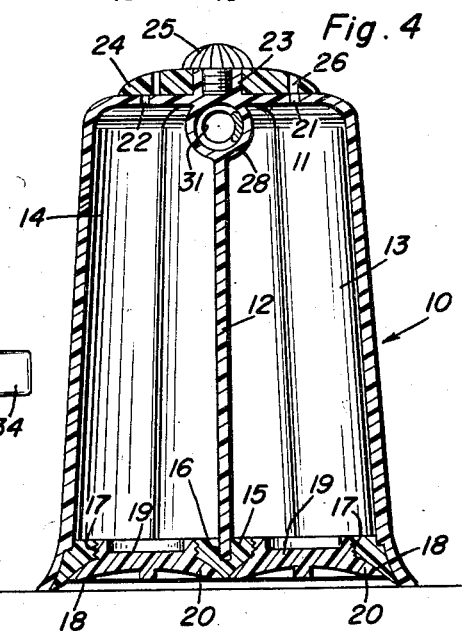
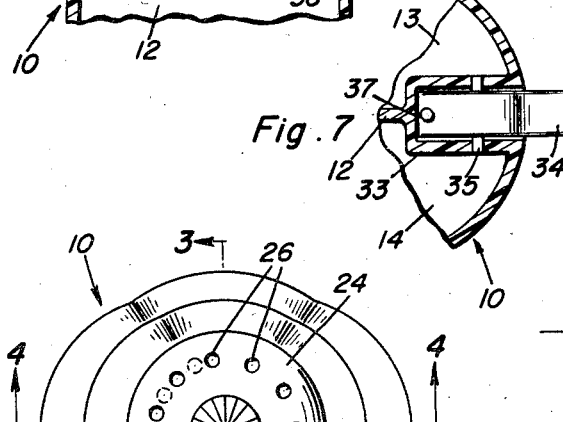
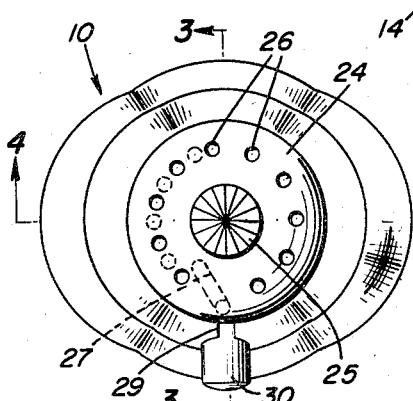
LaMar S. Williams
INVENTOR.

United States Patent Office 2,789,732
Patented Apr. 23, 1957

2,789,732

SALT AND PEPPER SHAKER

La Mar S. Williams, Salt Lake City, Utah

Application November 1, 1955, Serial No. 544,266

3 Claims. (Cl. 222—142.9)

The present invention relates to new and useful improvements in combination salt and pepper shakers and has for one of its important objects to provide, in a manner as hereinafter set forth, a device of this character comprising novel means for controlling the discharge of the salt and pepper.

Other objects of the invention are to provide a combination salt and pepper shaker of the character described which will be comparatively simple in construction, durable, compact, sanitary, attractive in appearance and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a view in rear elevation of a combination salt and pepper shaker constructed in accordance with the present invention;

Figure 2 is a top plan view of the device;

Figure 3 is a vertical sectional view, taken substantially on the line 3—3 of Figure 2;

Figure 4 is a vertical sectional view, taken substantially on the line 4—4 of Figure 2;

Figure 5 is a detail view in bottom plan of the rotary closure;

Figure 6 is a fragmentary view in vertical section through a modified form of the invention; and Figure 7 is a view in horizontal section, taken substantially on the line 7—7 of Figure 6.

Referring now to the drawing in detail, it will be seen that reference character 10 designates generally an upwardly tapered container of suitable capacity. The container 10, which may be of any desired plastic, is produced by injection molding. The container 10 includes an integral top 11. A partition 12 divides the container 10 into salt and pepper compartments or chambers 13 and 14, respectively.

Mounted in the lower portion of the container 10 is a bottom 15. The bottom 15 has formed transversely therein a groove or channel 16 for the reception of the lower end portion of the partition 12. On opposite sides of the partition 12, the bottom 15 is further provided with threaded filling openings 17 for the compartments 13 and 14. The lower portion of the bottom 15 has formed therein depressions providing funnels 18 which communicate with the openings 17 to facilitate filling the compartments 13 and 14. Removable closure plugs 19 are screwed into the openings 17. The plugs 19 include rounded flanges 20 adapted to seat in the funnels or depressions 18 for further sealing the openings 17.

The top 11 of the container 10 has formed therein perforations 21 and 22 which communicate, respectively, with the salt and pepper compartments 13 and 14. Rising from the top 11 of the container 10 is an integral, internally threaded tubular hub 23. A substantially plano-convex closure 24 is rotatably mounted on the hub 23.

A cap screw 25 is threaded into the hub 23 and secures the closure 24 thereon. The closure 24 is provided with apertures 26 for registry with the apertures 21 and 22. The closure 24 is further provided, in its bottom, with a cam slot or groove 27 the purpose of which will be presently set forth.

Formed integrally beneath the top 11 of the container 10 is a horizontal cylinder 28 which is closed at one end and open at its other end. A radial slot 29 in the container top 11 communicates with the cylinder 28. Mounted for reciprocation in the cylinder 28 and projecting from the open end thereof is a plunger 30. A coil spring 31 in the inner end portion of the cylinder 28 yieldingly urges the plunger 30 outwardly. A pin 32, rising from the plunger 30 is operable in the slot 29 and engaged in the cam groove 27 for actuating the closure 24.

It is thought that the operation of the shaker will be readily apparent from a consideration of the foregoing. Briefly, certain of the perforations 26 are normally in registry with the perforations 21 while the perforations 22 are closed by the rotary closure 24. Thus, salt may be dispensed from the shaker without actuating the closure 24. However, when pepper is desired, the plunger 30 is pushed inwardly against the tension of the coil spring 31 for actuating the closure 24 through the pin 32. When the closure 24 is thus actuated the apertures 21 are closed and certain of the apertures 26 are brought into registry with the apertures 22 for permitting pepper to be dispensed from the compartment 14. When the plunger 30 is released said plunger is returned to inoperative position by the coil spring 31, thus returning the closure 25 to the position of Figure 4 of the drawing for again opening the salt apertures 21 and closing the pepper apertures 22. The pin 32 traveling in the groove 27, also functions as a stop for limiting the outward movement of the plunger 30 under the influence of the coil spring 31.

In the modification of Figures 6 and 7 of the drawing, the upper portion of the container 10 has formed therein an upwardly and outwardly opening chamber 33. A thumb lever 34 is pivotally mounted at an intermediate point, as indicated at 35, for operation in the chamber 33. A coil spring 36 in the lower portion of the chamber 33 yieldingly urges one end of the lever 34 outwardly. Rising from the other end of the lever 34 is a pin 37 which is engaged in the cam groove 27 for actuating the cover 24.

In use, with the thumb of the hand which grips the container 10, the lever 34 is actuated against the tension of the coil spring 36. Through the pin 37 the cover 24 is actuated to close the salt compartment of the container and to open the pepper compartment of said container. When the lever 34 is released it is returned to inoperative position by the spring 36 and the cover 24 is returned to its previous position for closing the pepper compartment and again opening the salt compartment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination shaker of the character described comprising: a container including salt and pepper compartments, said container further including a top having discharge apertures therein communicating with the compartments, a closure rotatably mounted on the top for controlling the apertures, and means for actuating said closure, said closure comprising a horizontal disk having a cam groove in the bottom thereof, said means including a movable member on the container, a pin on said member operable in the cam groove, said member being manually operable in one direction for actuating the disk in one direction, and a return spring in the container engaged with the member for actuating the disk in the opposite direction.

2. A combination shaker of the character described comprising: a container including salt and pepper compartments, said container further including a top having discharge apertures therein communicating with the compartments, said top further having a slot therein, a cylinder in the container communicating with the slot, an apertured disk rotatably mounted on the top for controlling the discharge apertures therein, said disk having a cam groove in its bottom communicating with the slot, a manually operable plunger slidable in the cylinder, a pin on said plunger operable in the slot and engaged in the cam groove for operatively connecting said plunger to the disk, and a return spring in the cylinder engaged with the plunger.

3. A combination shaker of the character described comprising: a container including salt and pepper compartments, said container further including a top having discharge apertures therein communicating with the compartments, said container still further including a chamber in its upper portion, a horizontal disk rotatably mounted on the top for controlling the discharge apertures, said disk having a cam groove in the bottom thereof communicating with the chamber, a thumb lever pivotally mounted in the chamber, a pin on said thumb lever engaged in the cam groove for operatively connecting said thumb lever to the disk, said thumb lever being manually operable in one direction for actuating the disk in one direction, and a return spring in the chamber engaged with said thumb lever.

References Cited in the file of this patent
UNITED STATES PATENTS

| | | |
|---|---|---|
| 215,441 | Dean | May 20, 1879 |
| 1,248,345 | Kunkler | Nov. 27, 1917 |
| 1,264,029 | Du Quay | Apr. 23, 1918 |
| 1,579,892 | Shaw | Apr. 6, 1926 |
| 2,241,044 | Stenberg | May 6, 1941 |
| 2,668,639 | Scalf | Feb. 9, 1954 |